XR 3,109,933
SEARCH ROOM

Nov. 5, 1963 D. M. BAUMANN 3,109,933

PHOTOELECTRIC HIGH SCANNING-RATE DIGITAL
STORAGE AND READ-OUT DEVICE

Filed May 27, 1958 3 Sheets-Sheet 1

INVENTOR.
Dwight M. Baumann
BY Rines and Rines
ATTORNEYS

3109933
OR IN 250/555

INVENTOR.
Dwight M. Baumann
BY Rines and Rines
ATTORNEYS

INVENTOR
Dwight M. Baumann
BY Rines and Rines
ATTORNEYS

United States Patent Office 3,109,933
Patented Nov. 5, 1963

3,109,933

PHOTOELECTRIC HIGH SCANNING-RATE DIGITAL STORAGE AND READ-OUT DEVICE

Dwight M. Baumann, Cambridge, Mass., assignor to Hydel Incorporated, Cambridge, Mass., a corporation of Delaware Filed May 27, 1958, Ser. No. 738,129
19 Claims. (Cl. 250—219)

The present invention relates to high-scanning-rate storage devices and methods and, more particularly, to photographic techniques for high-scanning-rate digital storage and read-out.

The art is replete with numerous types of techniques for first recording and then "reading" information or data in a wide variety of systems, including computers, function tables, library, assembly and programming data, and the like. Several possible photographic-type storage systems have been proposed for those applications where the storage requirement is of a permanent or semi-permanent nature and where it is desired to scan the stored data and elicit or "read out" a desired bit of information from the stored data. It has been proposed, for example, to employ photographic storage systems including a photographic pattern in the form of a rotating disc or drum and a flying spot scanner for cooperation therewith. Such a system, while having considerable storage capacity and a relatively high scanning rate, has been found to involve practical difficulties in controlling the scanning beam deflection and insuring the correct positioning of the scanning beam in alignment with the data. Cathrode-ray tube scanning light beams have also been employed for similar purposes, but these devices are also subject to the same practical difficulties. Embodied in such prior-art devices, are structures wherein the stored pattern or information is moved to effect scanning, and/or the read-out equipment is caused to scan, which limits the ultimate speed of the scan.

It has been determined, however, that improved results can be obtained, both in connection with the speed of the scanning and the elimination of the practical problems above-mentioned relating to the control of the scanning beam and its positioning with respect to the intelligence pattern, by producing an image of the data pattern from a rotating mirror system. The mirror system sweeps the image past an array or row of preferably stationary photoelectric-cells or other transducers, so that the transducers may effect a parallel reading of the complete row of data, as distinguished from successive individual elemental bits of information, as in prior-art scanning systems. It has been determined, for example, that a photoelectric storage system with cyclical access and parallel reading at one megacycle frequency or higher, can be successfully used for storage in digital computer assembly programs, library sub-routines, and similar applications, and may even be used to great advantage to control the sequencing and logic of a computer, as well as for other purposes requiring high-speed scanning. One of the fundamental objects and concepts underlying the invention is that of effecting random cyclical access to the stored data through very rapid scanning of a complete two-dimensional array of data, with "read-out" if and when the desired, pre-selected bit of information has been detected during the scan. This is to be contrasted with merely scanning, at inherently lower speeds, each successive element of a pattern of data.

A further object of the invention is to provide a new and improved photographic memory system and method that embody scanning techniques adapted for parallel reading.

Other and further objects will be explained hereinafter, and will be more particularly pointed out in the appended claims.

The invention will now be described in connection with the accompanying drawing, FIGURE 1, of which is a perspective view combined with a block electrical circuit diagram illustrating the invention in preferred form;

Figure 1:
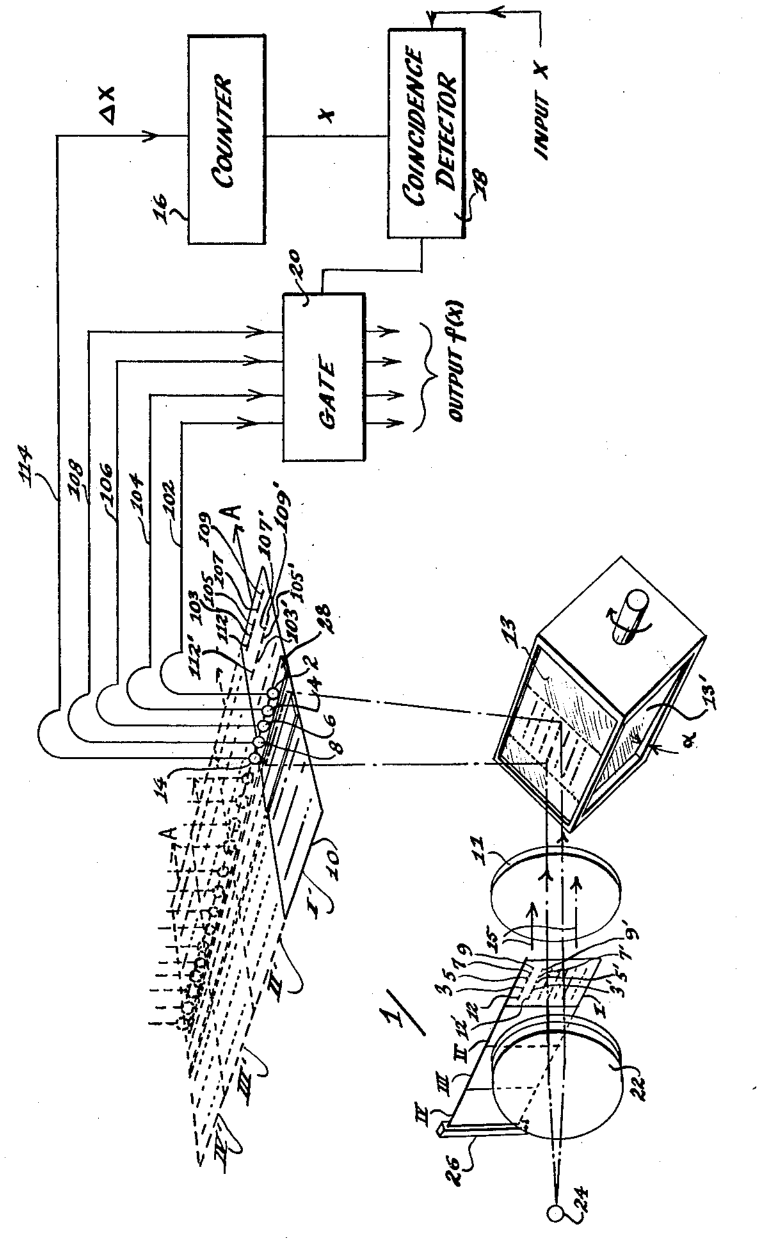

While it is to be understood that, as before indicated, the present invention is adapted for use in a wide variety of applications including, for example, the before-mentioned digital computer, library, business-record or program storage, and the like, and other applications, the invention is shown in FIGURE 1, for purposes of illustration, as applied to the important problem of a function table. This function table may be employed in, for example, an analog computer wherein it is required to rapidly "read out" a desired pre-selected function from a stored table of functions. That table may assume the form of a photographic pattern plate 1 having a photographically stored, two-dimensional array or sequence of binary digits I recorded thereupon, such as the horizontally extending rows of spots, 3—5—7—9, 3′—5′—7′—9′, etc., each displaced along the vertical dimension, one below the other. The digital spots 3—5—7—9, 3′—5′—7′—9′, etc. photographically recorded upon the pattern 1 are preferably of rectangular shape in order to differentiate from dust particles and the like that are generally of substantially circular shape. Each of the data elements comprising the bits of information 3—5—7—9 and 3′—5′—7′—9′, etc. will, of course, correspond to different binary digital data representative of different functions stored upon the photographic pattern 1, and they are shown of different coded sequence in FIGURE 1.

An image of the array I of the pattern recorded upon the photographic plate 1 is formed at I′ by transmitting light from a light source of any desired type, such as a lamp 24 and condenser lens system 22, through the photographic pattern 1 and directing the same as at 15 by a projection lens 11 upon a mirror face 13, thereby forming a virtual image of the array I thereupon. The projected light beam is reflected by the mirror 13 upward through a slit 28 upon an array or row of transducers, such as photoelectric diode or other light-to-electric energy transducer elements 2, 4, 6, and 8, in order to "read" in parallel the image of whatever elemental row of information 3—5—7—9 or 3′—5′—7′—9′, etc. maiy be projected thereupon through the slit 28.

The projection optical system will provide magnification in the image 10 so that the practical problem of the size and necessary separation of the transducer elements 2, 4, 6 and 8 can be correlated with the tiny bits of information 3—5—7—9, etc., by providing sufficient magnification that the separation of the corresponding magnified bits of information 103—105—107—109, 103′—105′—107′—109′, etc. will correspond to the required physical separation of the adjacent transducers.

By rapidly rotating the mirror 13 in the direction of the arrow, the image of each row of data 3—5—7—9, 3′—5′—7′—9′, etc. of the array I of the pattern 1 will successively move past and thus be presented to the array of transducers 2, 4, 6 and 8. Thus, the successive magnified images 103—105—107—109, 103′—105′—107′—109′, etc. will scan past the transducers 2, 4, 6 and 8 in the direction A, the transducers "reading" or sensing the successive image rows parallelly. Actually the image 10 and transducer array are shown in reversed position in FIG- URE 1 in order to simplify the drawing and render more facile the explanation of operations. In order to utilize the circular lens and rectangular pattern 1 to the fullest extent, the pattern 1 may consist of adjacent channels or arrays of data I, II, III, IV, etc. illustrated as successively horizontally displaced.

After the channel or array I has been scanned and "read," the next array II may be similarly scanned and "read" either by repetitively shifting the pattern 1 to the right, or, preferably by fixedly supporting the complete pattern 1 with all of its arrays at 26 in the projection light beam and employing successively increasingly skewed further mirrors 13', etc. in the other successive faces of the rotatable mirror scanning system.

The next successive mirror face 13' is skewed somewhat from the plane of the previous mirror face 13, as indicated by the angle $\alpha$, in order to project the next adjacent vertical column or array of data II of the pattern upon the array of transducers, as at II'. Similarly, further successively skewed mirror faces may be provided for directing images of the stored further arrays of information III and IV of the pattern 1 past the array of transducers, as at III' and IV'. The entire memory pattern 1 may therefore be "read" in one complete revolution of the mirror system 13, 13', etc., each successive mirror face scanning the successive channels or arrays I, II, III, IV. In effect, therefore, a magnified image 10 of the memory pattern 1 is caused to move in the direction A past the row of transducers 2, 4, 6, 8 etc., with the images of the adjacent columns or arrays I, II, III, IV presented successively thereto for sensing or "reading" thereby.

Figure 3:
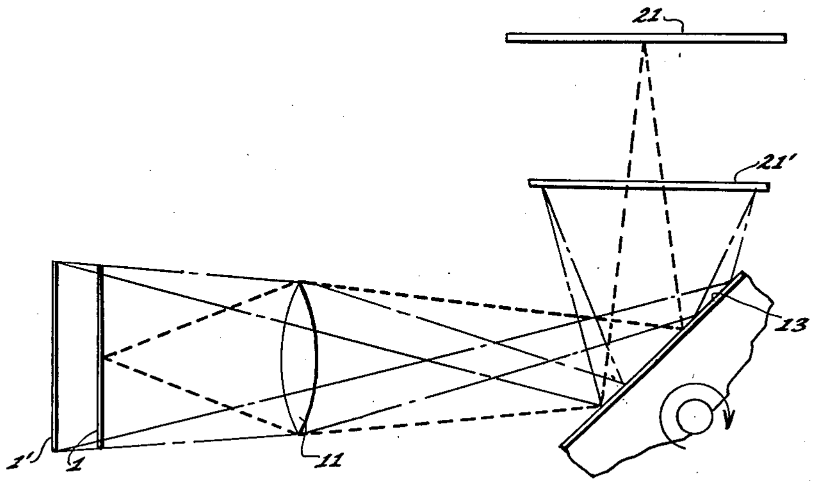
FIGURE 3 is a side elevation of still a further modification adapted for three-dimensional scanning.

By this technique, a large, high-scanning-rate photomemory system may be provided with parallel read-out information at the transducers 2, 4, 6, 8. The scanning rate is inherently high because of the speed magnification demonstrable by the laws of reflection, plus the fact that a multi-sided mirror 13, 13', etc. creates the same effect as placing many similar memory patterns along the circumference of a disc or drum, as in prior-art systems. The multi-sided mirror 13, 13', etc. moreover, may be of relatively small dimensions and can be rotated at much higher speed than can be achieved in prior-art photomemory systems that require a rotating, instead of a stationary, photographic medium 1. The memory pattern 1 has the further advantage of being a flat plate, perhaps of the same approximate dimensions as conventional photographic slides, enabling the stored information to be easily prepared. Several projection systems of the type illustrated, moreover, may be employed with allied "reading" transducer rows associated with each mirror system so that several tables can be read in synchronism, if desired. The "reading" of more than one pattern will be further discussed hereinafter in connection with the three-dimensional scanning system modification of FIGURE 3. The possible scanning rate is limited only by the obtainable speed of rotation of the mirror 13, 13', etc and the response time of the photo-transducers 2, 4, 6 and 8.

In the particular application illustrated in FIGURE 1, additional timing track information bits are provided at 12, 12', etc. aligned, respectively, with the rows of information 3—5—7—9 and 3'—5'—7'—9', etc. A timing track photo-transducer 14 may also be provided, connected by conductors 114 to a counter circuit 16 that will count the passage of the successive images 112, 112', etc. of the timing track elemental bits 12, 12', etc. as the images 112, 112', etc. successively pass the photo-transducer element 14. For the function generator purpose illustrated in FIGURE 1, the timing track 12, 12', etc. may also represent the argument of a function $f(x)$ which is stored somewhere on the photographic pattern 1 and which it is desired to "read out" in the manner shown. Each time a timing track element image 112, 112', etc. passes by the photo-transducer 14, a pulse is produced thereby and such pulse is fed to the counter 16 to actuate the same and advance the counter by one unit. When the counter 16 has counted to a pre-selected, predetermined value $x$, a coincidence detector 18, connected both to the counter 16 and the preselected desired data input $x$, may be actuated to transmit a pulse to a gate circuit 20, in order to open the same. The gate circuit 20 may then cause the signals detected at that instant by the row of photo-transducers 2, 4, 6, 8, etc. and fed to the gate circuit 20 by the respective conductors 102, 104, 106, 108, etc., to provide the desired "read-out" or output, labelled $f(x)$. The sequence of operation will then be as follows. For any desired pre-selected input $x$, the system will accumulate increments $\Delta x$ in the counter 16 until the value of the counter setting is equal to the $x$ input. As such time, the coincidence detector 18 will open the gate 20 and the value of the desired function $f(x)$ stored in the pattern 1, will appear at the output of the gate circuit 20.

It is, of course, to be understood that the counter circuit 16 connected to the photo-transducer 14, the coincidence detector 18, and the gate circuit 20, may all be of conventional design, as employed in computor circuits. Suitable counters 16 are, for example, described on pages 176–177 of Digital Computor Components and Circuits, R. K. Richards, D. Van Nostrand and Co., 1957; suitable multiple-input gate circuits 20, on page 106 and elsewhere; and conventional coincidence circuits using "and" and "or" gates, on pages 37–38 and elsewhere. If desired, moreover, the photo-transducers 2, 4, 6, 8 connected with the gate circuit 20 may first feed amplifiers, not shown, in the circuit connections 102, 104, 106, 108 between the respective photo-transducer elements and the gate circuit 20, as is well known.

As a practical illustration, a simple 35-mm. slide projector 24—22—11 has been successfully employed with a memory pattern 1 of 110 lines per inch, scanned by a 3600 r.p.m. rotating mirror 13 for producing single-bit reading rates up to $1 \times 10^6$ cycles per second. The pattern 1 in these tests corresponded to 220 bits per inch, with the use of the timing track system, above-discussed. A pattern 1 with 500 lines per inch, corresponding to 1000 bits per inch, has also been successfully resolved. As another example, a memory pattern 1, approximately 4 x 4 inches, containing $16 \times 10^6$ bits of information, each bit being 0.0005 x 0.002 inch, may also be employed; this information being written in parallel channels I, II, etc., each approximately 40 bits in width and 4 inches in length. A ten-sided skewed mirror 13, 13', etc. may give access to one-fifth of the information in one revolution of the mirror. A five-positional shift mechanism for moving the memory pattern 1 laterally after each revolution of the mirror or similarly shifting the array of photocells 14, 2, 4, 6, 8, or the use of five sets of such photocells, will thus give rapid access to the entire $16 \times 10^6$ bits of information.

It is not essential that the particular optical system of FIGURE 1 be employed. Thus, for example, in FIGURE 4, a parallel-light system is schematically illustrated employing the photographic storage pattern 1, a collimating lens 11, an image lens 11', and the rotating scanning mirror 13, etc. interposed between the collimating and imaging lenses. While, in the system of FIGURE 1, the image 10 of the pattern 1 may move slightly into and out of the plane of the array of photocells 2, 4, 6, 8, etc. as a result of varying optic pathlength as portions of the mirror 13, 13', etc. rotate closer to and farther from the lens 11, the parallel-light-ray system of FIGURE 4 completely avoids this effect, which may become undesirable in some applications. Since the information read at any instant of time is contained in a one-dimensional fan of parallel beams, moreover, the arrangement of FIGURE 4 permits the imaged pattern effectively to spread out more, making possible increased space between the transducers 14, 2, 4, 6, 8, which will be placed at the image region. The system of FIGURE 4 is of particular utility with patterns 1 of very dense spots and patterns 1 of large size.

Figure 4:
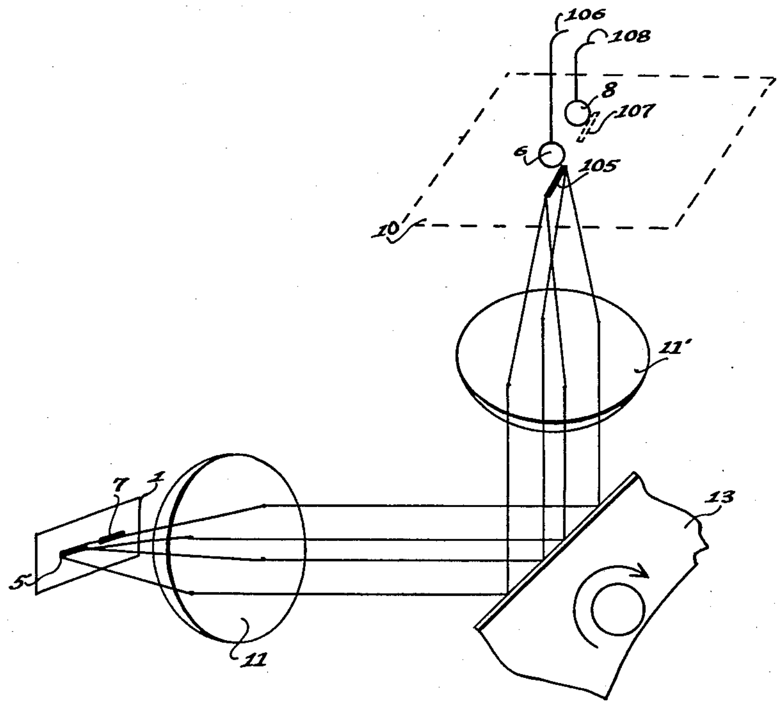
FIGURE 4 is a fragmentary perspective of a system similar to FIGURE 1, employing a modified optical scanning system.

While the pattern 1 has been shown supported at 26 in the projection system of FIGURES 1 and 4, it may also be placed at other locations. Thus, in FIGURE 2, through the use of a slit 28′ between the condenser lens system 22 and the projection lens 11, the pattern 1 may be placed near the array of transducers 2, 4, 6, etc. In this embodiment, therefore, a slit of light is projected upon the rotating mirror 13, etc.; and is caused to scan the pattern 1. A system of preferably pillow-shaped lenses 30, disposed between the pattern 1 and the transducers 2, 4, 6, etc., will focus the scanning transmitted light upon the photocell transducers.

Figure 2:
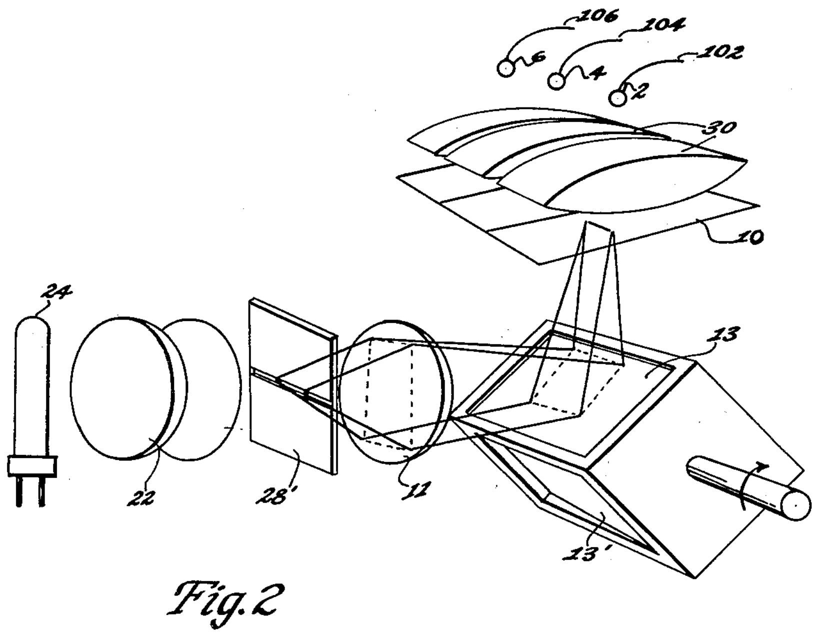
FIGURE 2 is a similar view of a modification.

The invention is similarly not limited to the two-dimensional rapid scanning disclosed in FIGURES 1, 2 and 4, but it is also useful for three-dimensional scanning. Thus, in FIGURE 3, two patterns 1 and 1′ are provided, one in front of the other. It is necessary that the patterns 1 and 1′ be sufficiently transparent that the light from the light source will be transmitted through the pattern 1′ and will, in turn, be transmitted through the second pattern 1 to the lens 11. The pattern 1′ will create an image 21′ which is closer to the mirror 13 than the image 21 formed from the pattern 1. The magnification of the image 21′ will be slightly less than that of the image 21. Patterns, such as 1 and 1′, may thus be stacked in as many numbers as desired, provided sufficient light is transmitted therethrough. The pattern 1, for example, will only tend to cut down the amount of light which is transmitted through the lens 11 to the image region 21′. Since, in the case of binary-coded patterns, black and white spots are employed, the probability of there being a black spot at any particular point is approximately equal to the probability of there being a white spot. With a large scale, therefore, the amount of light through each pattern should be substantially one-half the amount that would be transmitted through a clear plate without any binary information. More information can thus be scanned, and additional significance to information can be stored and scanned from more dimensions. Thus, for example, a function $f(x, y, z)$ could be "read out" of such a three-dimensional stored pattern system as that shown in FIGURE 3.

While the invention has been described in connection with the use of visible light energy, such as that emanating from a lamp or other light source, it is, of course, to be understood, that other types of radiant energy may also be employed; such as, for example, sources of infra-red and ultra-violet radiation, to mention but two, and the term "radiant energy" as used in the specification and claims herein, is intended to embrace all types of energy adapted to form images. It will also be clear, that, instead of employing projection-type optical systems, the radiant energy may, if desired, be reflected from, instead of transmitted through the image pattern 1, thereby to produce a radiant-energy image. The patterns 1, moreover, need not be of the particular photographic-film type herein described and, indeed, may be of a semi-permanent or erasable nature, as well. It will also be apparent that more than one row of phototransducers 14, 2, 4, 6, 8, or other corresponding radiant-energy-to-electric-signal transducers may, if desired, be employed, as may be different geometrical configurations for the array of transducers than the linear row that has been illustrated.

By increasing the number of slits 28′ of FIG. 2, moreover, or by providing some other appropriate pattern in its stead, a plurality of images will be scanned past the transducers 2, 4, 6, etc. which will accordingly act as an automatic "or" gate, indicating that one or another of the images is available for "read-out." It should be observed, in addition, that all of the systems herein described can produce at the transducers a high-frequency pulse output which of itself may be useful. The mirror system 13, furthermore, can be employed as an angular position indicator, if desired, or, by moving the mirror back and forth toward the lens 11, a linear position indicator. If the shaft of the mirror system 13 is connected to a galvanometer movement, the device can be used as a digital voltmeter, as well.

Further modifications will occur to those skilled in the art, and all such are considered to fall within the spirit and scope of the invention, as defined in the appended claims.

What is claimed is:

1. Apparatus of the character described having, in combination, means for supporting a pattern containing a plurality of successively positioned two-dimensional arrays of data, means comprising a source of radiant energy for producing successive magnified images of elements of each successive array of data extending along one dimension thereof, each successive image being displaced along the second dimenson of the pattern, an array of image-responsive transducers, each of which is spaced from its adjacent transducer a distance corresponding to the magnified separation between adjacent bits of data in the image, and means comprising a plurality of successively positioned mirrors rotatable in the path of the image-producing means, the successive mirrors being skewed at successively different angles with respect to the axis of rotation, thereof, for causing the successive magnified images of each array of data to be presented successively to the transducer elements, thereby to scan the pattern image, means for pre-selecting predetermined data that may be contained within the pattern, and means responsive to the pre-selected means and the transducers for producing an indication if the predetermined data has been presented to the transducers during the said scan.

2. Apparatus of the character described having, in combination, means for supporting a pattern containing a plurality of successively positioned two-dimensional arrays of data, means comprising a source of radiant energy for producing successive magnified images of elements of each successive array of data extending along one dimension thereof, each successive image being displaced along the second dimension of the pattern, an array of image-responsive transducers, each of which is spaced from its adjacent transducer a distance corresponding to the magnified separation between adjacent bits of data in the image, and means comprising a plurality of successively positioned mirrors rotatable in the path of the image-producing means, the successive mirrors being skewed at successively different angles with respect to the axis of rotation, thereof, for causing the successive magnified images of each array of data to be presented successively to the transducer elements, thereby to scan the pattern image.

3. Apparatus of the character described having, in combination, means for supporting a pattern containing a two-dimensional array of data, means for producing successive images of elements of the pattern extending along one dimension thereof, each successive image being displaced along the second dimension of the pattern, an array of image-responsive transducers, means for causing the successive images to be presented successively to the transducer elements, thereby to scan the pattern image, means for pre-selecting predetermined data that may be contained within the pattern, and means comprising a gate circuit controlled in response to the pre-selecting means and the transducers for producing an indication if the predetermined data has been presented to the transducers during the said scan.

4. Appartaus as claimed in claim 3 and in which there is provided a counter connected with at least one of the transducers, a coincidence detector connected to the counter and the pre-selecting means to detect coincidence therebetween, means for connecting a plurality of the array of transducers to the gate circuit, and means for connecting the coincidence detector to control the gate circuit.

5. Apparatus as claimed in claim 3 and in which the pattern is provided with a timing track and at least one of the transducers of the array of transducers is responsive to the image of the timing track.

6. Apparatus of the character described having, in combination, means for supporting a pattern containing a two-dimensional array of data, means comprising a source of radiant energy for producing successive images of elements of the pattern extending along one dimension thereof, each successive image being displaced along the second dimension of the pattern, an array of radiant-energy-responsive transducers, means comprising a rotatable mirror in the path of the image-producing means for causing the successive images to be presented successively to the transducer elements, thereby to scan the pattern image, said image producing means comprising a slit, said pattern being disposed between said mirror and said array of transducers, and focussing means located between said pattern and said array of transducers.

7. Apparatus of the character described having, in combination, means for supporting a pattern containing a two-dimensional array of data, means comprising a source of radiant energy for producing successive images of elements of the pattern extending along one dimension thereof, each successive image being displaced along the second dimension of the pattern, an array of radiant-energy-responsive transducers, means comprising a rotatable mirror in the path of the image-producing means for causing the successive images to be presented successively to the transducer elements, thereby to scan the pattern image, a further pattern between the first-mentioned pattern and said mirror, and a further array of transducers arranged to respond to the image of said further pattern.

8. Apparatus of the character described having, in combination, means for supporting a plurality of patterns, one in front of the other and each containing a two-dimensional array of data, means for producing successive images of elements of the patterns extending along one dimension thereof while maintaining the patterns in fixed position, each successive image being displaced along the second dimension of the patterns, a plurality of arrays of image responsive transducers, one corresponding to each pattern, and means for causing the successive images of the patterns to be presented successively to the corresponding transducers, thereby to scan the pattern image.

9. Apparatus of the character described having, in combination, means for supporting a substantially stationary pattern containing an array of data spaced along two dimensions, means for producing an optical image of substantially said entire pattern containing said two-dimensional array of data, an array of image-responsive transducers arranged substantially along one of said dimensions and having parallel read-out channels therefrom, and optical scanning means for causing successive portions of said image extending along said one dimension thereof to be presented successively to the transducers of said array, thereby to scan said pattern image along the other dimension and produce signals in said parallel read-out channels corresponding to the data in said two-dimensional array.

10. The apparatus of claim 9, said image producing means comprising means for producing a magnified image of said pattern.

11. The apparatus of claim 10, said transducers being spaced apart a distance corresponding to the magnified separation between adjacent bits of data in said image.

12. The apparatus of claim 9, further comprising means for pre-selecting predetermined data that may be contained within said pattern, and means responsive to said pre-selecting means and said transducers for producing an indication if said predetermined data has been presented to said transducers during said scan.

13. The apparatus of claim 9, said image producing means comprising a source of radiant energy, said transducers being responsive to said radiant energy, and said optical scanning means comprising a rotatable mirror.

14. The apparatus of claim 13, said image producing means comprising a focusing system for producing substantially parallel-ray radiant energy in the path from said source to said mirror.

15. The apparatus of claim 13, said image producing means comprising a projection system, said pattern being located between said projection system and said mirror.

16. The apparatus of claim 9, said pattern having a timing track, and at least one of said transducers being responsive to the image of said timing track.

17. The apparatus of claim 9, there being a plurality of said two-dimensional patterns arranged to be scanned in sequence.

18. The apparatus of claim 9, further comprising means embodying a slit of predetermined configuration between said scanning means and said array of transducers.

19. The apparatus of claim 9, said pattern having a plurality of said arrays of data and arranged to be shifted in position for sequential scanning of said arrays of data.

References Cited in the file of this patent

UNITED STATES PATENTS

| | | |
|---|---|---|
| 1,966,354 | Noxon | July 10, 1934 |
| 1,977,875 | Donaldson | Oct. 23, 1934 |
| 2,231,186 | Gould | Feb. 11, 1941 |
| 2,240,545 | Bryce | May 6, 1941 |
| 2,294,734 | Bryce | Sept. 1, 1942 |
| 2,370,160 | Hansell | Feb. 27, 1945 |
| 2,540,654 | Cohen et al. | Feb. 6. 1951 |
| 2,605,965 | Shepherd | Aug. 5, 1952 |
| 2,620,978 | Carroll et al. | Dec. 9, 1952 |
| 2,640,880 | Aigrain et al. | June 2, 1953 |
| 2,666,356 | Graham et al. | Jan. 9, 1954 |
| 2,769,922 | Peery | Nov. 6, 1956 |
| 2,812,447 | MacMartin et al. | Nov. 5, 1957 |
| 2,848,535 | Hunt | Aug. 19, 1958 |
| 2,901,730 | Goddard | Aug. 25, 1959 |